(12) United States Patent
Ions et al.

(10) Patent No.: US 6,189,575 B1
(45) Date of Patent: Feb. 20, 2001

(54) RECOVERABLE ARTICLE

(76) Inventors: David Ions, 1 Coxs Road, Shrivenham, Wiltshire, SN6 8EL; Philip Roland Winfield, Churchfield House, Latton, Swindon, Wiltshire, SN6 6DS, both of (GB); Josef Toerringer, D-83128 Halfing, Sonnendorf 4 (DE); George Gansbuehler, 4 Harptree Close, Nine Elms, Shaw, Swindon, Wiltshire, SN5 9UN (GB); Sean Michael Lewington, 9 Totterdown Close, Swindon, Wiltshire, SN3 5DT (GB); Philip Costigan, 41 Ravenscroft, Covingham, Swindon, SN3 5AE, Wiltshire (GB)

( * ) Notice: Under 35 U.S.C. 154(b), the term of this patent shall be extended for 0 days.

(21) Appl. No.: 09/380,522

(22) PCT Filed: Mar. 18, 1998

(86) PCT No.: PCT/GB98/00822

§ 371 Date: Sep. 3, 1999

§ 102(e) Date: Sep. 3, 1999

(87) PCT Pub. No.: WO98/42056

PCT Pub. Date: Sep. 24, 1998

(30) Foreign Application Priority Data

Mar. 19, 1997 (GB) .................................................. 9705697

(51) Int. Cl.[7] ........................................................ F16L 3/00
(52) U.S. Cl. ........................... 138/106; 138/113; 138/120; 138/128; 138/153; 138/155; 138/157; 138/173
(58) Field of Search ................................... 138/106, 113, 138/120, 128, 153, 155, 157, 173

(56) References Cited

U.S. PATENT DOCUMENTS

| | | |
|---|---|---|
| 3,515,798 | 6/1970 | Sievert . |
| 3,824,331 | 7/1974 | Mixon, Jr. et al. . |
| 4,070,746 | 1/1978 | Evans et al. . |
| 4,233,731 | 11/1980 | Clabburn et al. . |
| 4,237,609 | 12/1980 | Clabburn et al. . |
| 4,332,849 | 6/1982 | Barkus et al. . |
| 4,410,009 | 10/1983 | Blum . |
| 4,824,502 | * 4/1989 | Nagayoshi et al. ................... 138/129 |
| 5,799,704 | * 9/1998 | Andre ................................... 138/146 |
| 5,856,634 | 1/1999 | Borgstrom . |
| 5,884,670 | * 3/1999 | Akedo et al. ......................... 138/119 |

FOREIGN PATENT DOCUMENTS

| | | |
|---|---|---|
| 0435569 | 7/1991 | (EP) . |
| 0530952 | 3/1993 | (EP) . |
| 0590469 | 4/1994 | (EP) . |
| 0683557 | 11/1995 | (EP) . |
| 2018527 | 10/1979 | (GB) . |
| 1556677 | 11/1979 | (GB) . |
| WO 98/27632 | 6/1998 | (WO) . |

OTHER PUBLICATIONS

Patent Abstracts of Japan, vol. 8, No. 20 (M–271) (abstract of JP 58–179634 (Sumitomo Electric)), Oct. 1983.

* cited by examiner

Primary Examiner—James Hook
(74) Attorney, Agent, or Firm—Myers Bigel Sibley & Sajovec

(57) ABSTRACT

A recoverable article comprising an inner resilient tubular member that is held out in a laterally expanded configuration by engagement with outer holdout structure, wherein the outer surface of the inner member is provided with a plurality of cavities, and wherein the holdout structure occupies the cavities so as to provide the holdout engagement, wherein the holdout structure comprises at least one initiating portion that is structurally different from the remaining portion that engages at least one associated cavity, whereby release of the initiating portion from its cavity facilitates subsequent release of the remaining portion of the holdout structure.

29 Claims, 4 Drawing Sheets

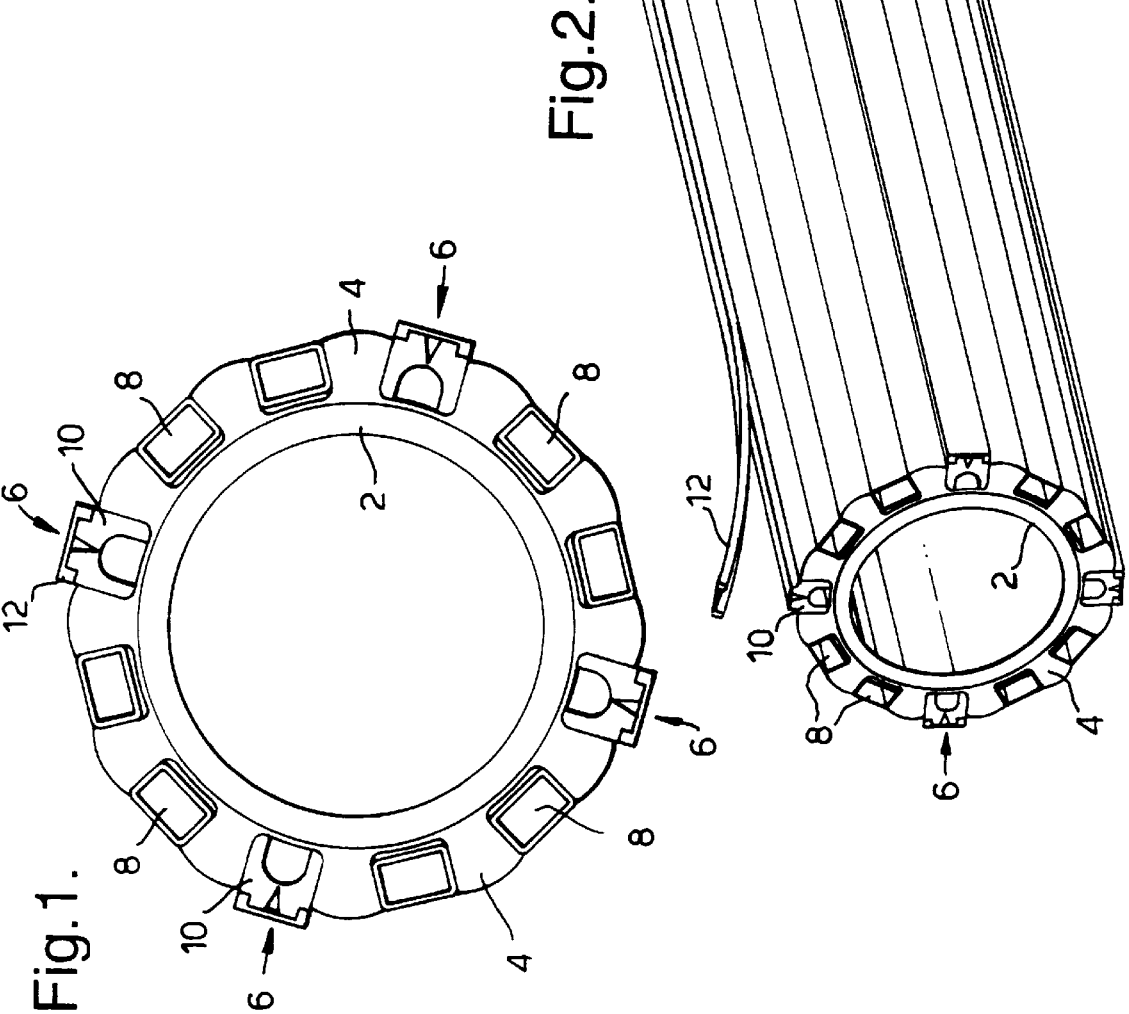

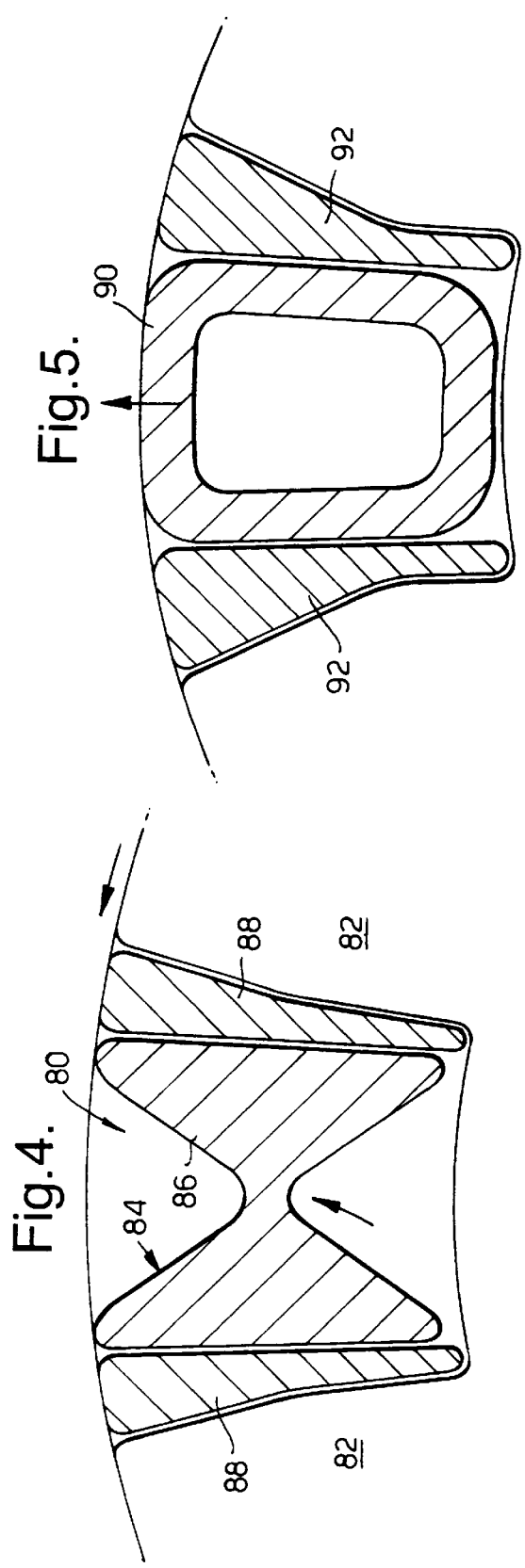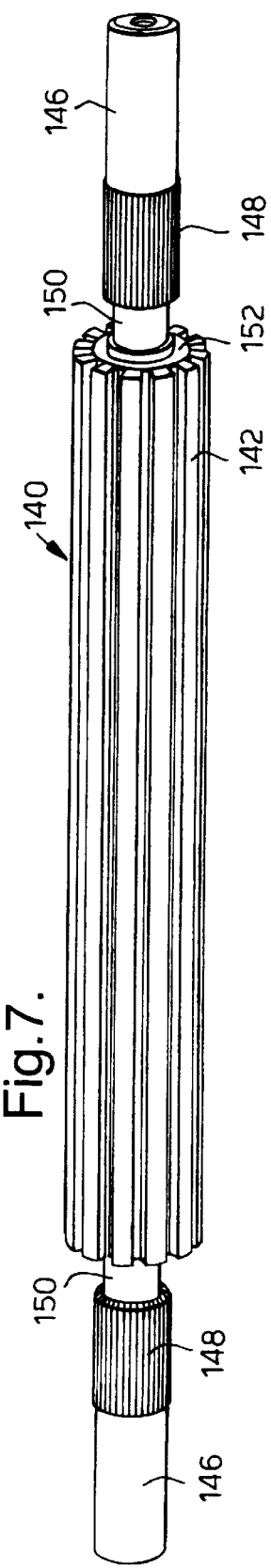

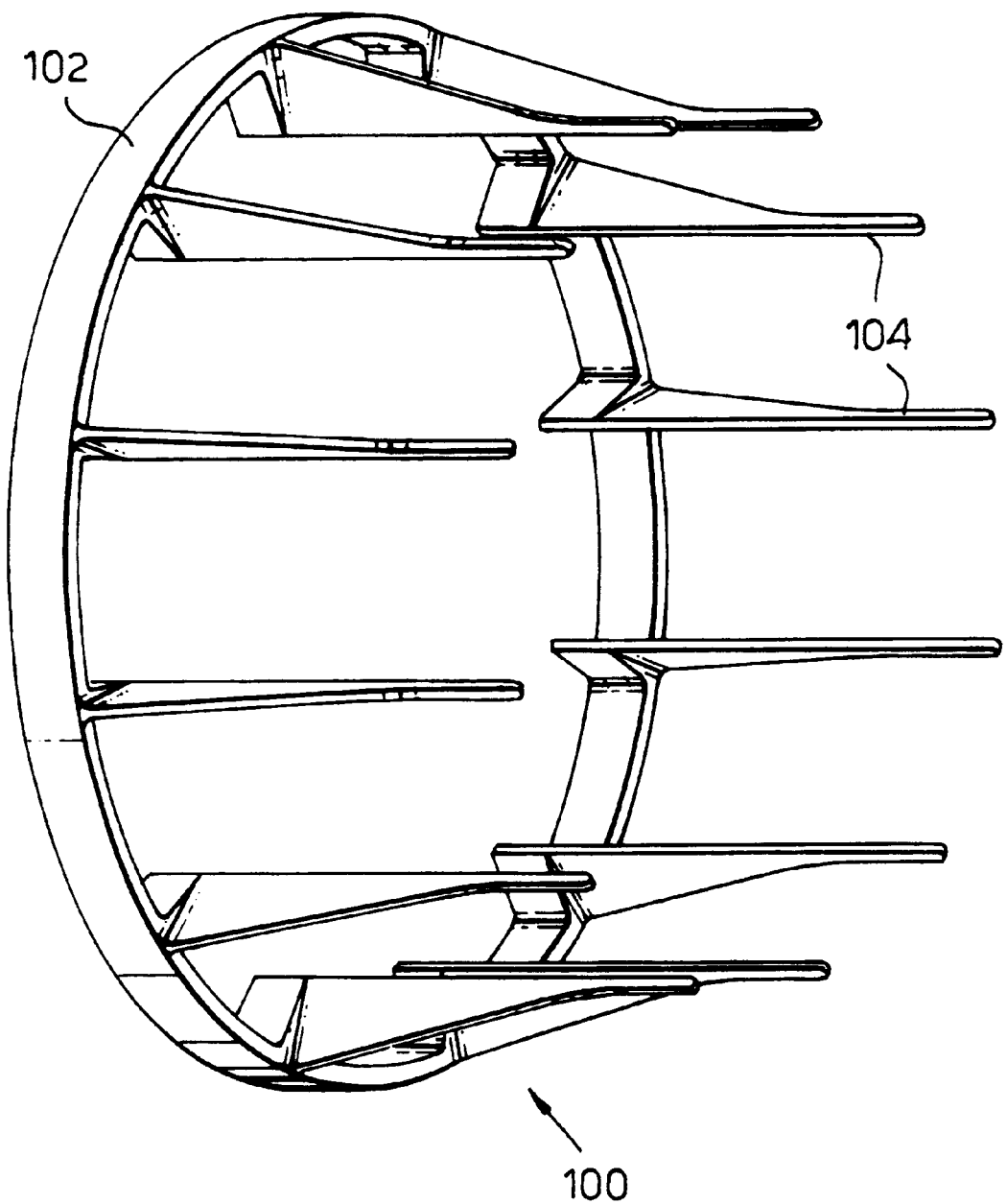

RECOVERABLE ARTICLE

This invention relates to a recoverable article for, and method of, enclosing an elongate substrate. The substrate may comprise for example a cable, which may be an electrical power or telecommunications cable, and in particular a cable connection. The cable connection may comprise a joint, or splice, between two, or more, cables, or a termination of a cable, for example on to a terminating lug or bushing connected to electrical equipment such as switchgear or a transformer. The termination may comprise an adapter, for example an elbow.

The invention will be further particularly described with reference to an in-line joint between two electric power cables, but it is to be understood that this is by way of example only and not by way of limitation.

Joints between two power cables, whether either or both are polymeric or paper insulated cables, need to be enclosed within a protective arrangement that includes an electrically insulating layer. Heat shrink technology has been applied for this purpose for many years, with products available from Raychem and others. However, technologies that do not require heat are also employed. Push-on sleeves and elbows are available but unlike heat shrinkable products, these have severe range-taking limitations that necessitate a large inventory. Other so-called cold applied solutions require a tubular elastomeric sleeve to be radially expanded and mounted on a rigid holdout member, the internal diameter of which is larger than the maximum outer diameter of the cable joint to be enclosed. One example of the latter is the PST sleeve available from 3M, as exemplified in U.S. Pat. No. 3,515,798. Such a sleeve has an inner holdout member that consists of a continuous narrow strip of tough flexible material in the form of a rigid closed helix having adjacent coils interconnected. The held out sleeve is mounted over the cable joint and the helical strip is then unwound, thus allowing the insulating stretched elastic cover to shrink down onto the joint. However, it is inconvenient having to unwind the holdout strip helically around the extended cable, especially if the work has to be done in the confined space of a trench or manhole. Another example of a cold applied arrangement is disclosed in U.S. Pat. No. 3,824,331 (AMP), in which a resilient tubular cover is supported in a stretched condition by an easily removable external one piece support member, each end of the cover being rolled back over the outside of the support. The cover and support member are mounted on an internal sleeve in the form of a longitudinally slit tube held in a state of increased diameter by a dividing strip in the shape of an I-beam. When in position over the cable joint, removal of the dividing strip longitudinally from the slit allows the inner tube to be squeezed and then freely withdrawn from the cover. The cover ends are then unrolled onto the adjacent cable sections and the external support member is removed. It will be appreciated that such an arrangement requires an inner and an outer holdout member, each of which has to be removed. EP-B-0 530 952 (3M) discloses a cover assembly in which an elastomeric tube is held out in a stretched condition on an inner support core. The core is frangible such that application thereto of a force beyond that produced by the tube causes breakage of the core so as to allow contraction of the elastomeric tube onto the substrate. The fragments of the collapsed core remain within the tube and must therefore be as small as possible to facilitate accommodation therewithin.

With each of these arrangements, the holdout member is disposed internally of the sleeve that is to be applied to the substrate cable. Thus, the sleeve cannot conveniently have an internal coating, of gel, mastic or adhesive for example, applied thereto. This problem, is avoided by the recoverable sleeve assembly disclosed in U.S. Pat. No. 4,410,009 (Sigmaform), in which an inner elastomeric tube is maintained in a radially-stretched condition by having an outer rigid tube surrounding and secured to the outer surface thereof. The outer tube is a rigid thermosetting adhesive polyurethane whereby the outer tube is sufficiently adhesive to hold the inner tube in its stretched condition but will peel from the inner tube upon impact of force. U.S. Pat. No. 4,070,746 (Raychem) discloses a recoverable tubular article in which an elastomeric sleeve is retained in a radially expanded condition by an outer constraint that is bonded thereto. The restraint is sufficiently strong to retain the sleeve in its expanded form under ordinary conditions of storage, but is susceptible to attack by solvents that weaken the bond sufficiently to allow the elastomeric sleeve to peel away from the restraint and to recover towards its original state. U.S. Pat. No. 4,233,731 (Raychem) discloses a dimensionally-recoverable article comprising a hollow resilient member which has been expanded to a dimensionally unstable configuration in which it is retained by a keeper positioned between and separating two parts of the hollow member away from the path of recovery thereof. The keeper is made from a material that weakens or changes its shape upon heating and/or chemical treatment, for example by being chemically degradable when subjected to a solvent. In one embodiment a single wedge of fusible material is interposed in the break in the circumference of a split tube of beryllium copper alloy. In another embodiment a tubular member made from an engineering plastics material has dovetailed protuberances on its outer surface between which strips of a polycarbonate are inserted to maintain the expanded configuration. EP-A0590469 (Kabelmetal) discloses a recoverable elastomeric tubular article that is held in its expanded state by thermoplastic bracing means in the form of a profile applied helically to the outer surface of the expanded tube.

It is an object of the present invention to provide a recoverable article and its method of manufacture, in which the article is held out in its expanded configuration by an advantageous external holdout means so as not to interfere with any inner layer, of gel, adhesive or mastic material for example, which may be applied internally thereof as a coating or which may be located around the substrate to be enclosed.

Thus, in accordance with one aspect of the present invention, there is provided a recoverable article comprising an inner resilient tubular member that is held out in a laterally expanded configuration by engagement with outer holdout means, wherein the outer surface of the inner member is provided with a plurality of cavities, and wherein the holdout means occupies the cavities so as to provide the holdout engagement, wherein the holdout means comprises at least one initiating portion that is structurally different from the remaining portion that engages at least one associated cavity, whereby release of the initiating portion from its cavity facilitates subsequent release of the remaining portion of the holdout means.

The forces generated within an expanded resilient member tending to cause it to recover can be large, the more so the thicker is the wall of the material. Thus, although such a cavitied member can be expanded and kept in its expanded configuration by maintaining the enlarged size of the cavities, in some instances it can be found to be extremely difficult, due to high frictional forces, to remove the holdout means in order to allow the member to recover towards, or, in the absence of an underlying substrate, to its original configuration. This difficulty is exacerbated the larger is the interface between the holdout means and the member, such as for example where the holdout means comprises a strip filling a cavity in the form of a long channel. It can be almost impossible to remove such a strip from the channel. By providing the holdout means with an initiating, or trigger, portion that is structurally different from the remaining portion, the initiating portion can be arranged to be released more easily, and advantageously manually, thereby reducing the frictional forces retaining the remaining portion of the holdout in place, which can then itself also be removed manually.

Preferably, the or each initiating portion comprises two parts such that (a) when the two parts engage one another, the integrity of the holdout means is maintained, and (b) when one of the two parts is released from the other part that is in engagement with the cavity, the other part is removable from the inner member. In such an article, release of the two parts from each other may allow the other part to be ejected from the cavity by the recovery force of the resilient member.

In one embodiment, the trigger, or other, holdout means may comprise at least one high modulus material strip engaging respective channels of the castellated outer surface of the inner member, each strip being encased within a lower modulus sheath that retains a lubricant. Release of the holdout may be effected by slitting the outer sheath from one end to the other so that the lubricant facilitates the recovery force of the inner member urging the strips out of the channels. The slitting may be effected by an annular ring with inwardlyprojecting cutting surfaces for engaging more than one holdout strip.

Advantageously, the release of the one part of the initiating portion may result in the other part undergoing a change of shape, for example by a pivoting or hinging movement, that facilitates its removal from the cavity.

The two parts may interlock, be hinged together, and may be integrally formed. Fracture of, for example cutting through, one of the parts may allow a change of shape so that the other part can be removed from the cavity. Alternatively, one part may be inserted within the other thereby to maintain the shape of the other part to prevent collapse, or recovery, of the cavity. In the latter embodiment, removal of the insert may result in the recovery force of the member collapsing and ejecting the other part.

The holdout means may comprise a plurality of initiating portions located symmetrically on the outer surface of the resilient member, whereby the remaining portion of the holdout means is relatively easily removable subsequent to removal of all the initiating portions. However, it is presently more preferred for there to be a single initiating portion.

Advantageously, the cavities comprise a plurality of channels that extend longitudinally of the article, preferably parallel to one another, and preferably parallel to the longitudinal axis of the tubular member. Alternatively, the channels may extend helically wound around and along the resilient member. The channels may be of substantially rectangular configuration, but they may be re-entrant so as to enhance retention of the holdout means therein. Preferably, the channels are provided by the resilient member having a castellated outer surface.

The or each initiating portion and/or the remaining portion of the holdout means may comprise a plurality of strips that are retained within respective ones of the channels. The strips are preferably removable by a peeling action from one end thereof to the other.

In a particularly preferred embodiment the initiating portion comprises a single strip (which may comprise two or more parts), and the remaining portion of the holdout means comprises a plurality of other strips. Recovery of the resilient tubular member is carried out by removal of the initiating strip and subsequent removal of the other strips, preferably sequentially around the circumference of the tubular member. This method of recovery (shrinkage) of the tubular member has the advantage that it helps to prevent entrapment of air beneath the member when recovered.

In embodiments in which the holdout means comprises a plurality of strips, the article may include one or more (preferably two) supports, for example in the form of rings, to retain the tubular member (preferably via the holdout strips), in a substantially circular cross-sectional configuration. The or each support is preferably located radially inwards of the holdout strips and/or the tubular member. The or each support may be located adjacent to an end of the tubular member, preferably exterior to the tubular member.

One portion of the holdout means may be applied in a flowable form, such as sand or other granular material, and held in place by a wrapping of polymeric or other suitable material. The flowable material may be a hardenable, or curable, material, such as plaster of paris, cement, a curable epoxy resin system or other thermoset, which may or may not require a wrapping.

In general, however, whether or not the holdout means is flowable, it may be desirable to enclose the article of the invention within an outer sheath to enhance retention of the holdout means during storage and transport.

One portion of the holdout means may comprise foam, preferably high density foam, which may be formed in strips to fit channels in the outer surface of the inner member for example, or which may be foamed in situ to fill the expanded cavities.

In a further embodiment the holdout may be formed by a layer extending around the entire circumference of the inner member and bonded thereto so as to extend over the top of the cavities. In its holdout configuration, the layer may be deflected into the cavities, and may be flipped outwards, for example progressively from one end of the article to the other, so as to hinge to a configuration that allows recovery of the article.

One portion of the holdout means may be formed, especially when of strip configuration, of material that exhibits good resistance to compression in the transverse direction, whilst exhibiting more flexibility, or brittleness, in the longitudinal direction of the inner member, thereby to facilitate controlled removal thereof, and thus controlled recovery of the inner member. Cardboard has been found to be a suitable material, for example a material comprising composite layers of Kraft board approximately 0.9 mm thick. Wooden laths, fibre board or plasterboard are also suitable materials. In the latter case, a board comprising a layer of plaster 9 mm thick laminated between layers of cardboard giving an overall thickness of about 10 mm has been found suitable. Such holdout means are comparatively cheap and are also bio-degradable. It is also envisaged, however, that the holdout means of the article of the invention may be polymeric, preferably bio-degradable.

The holdout means may be extruded on to the outer surface of the inner tubular member.

Advantageously, the cavities, for example the longitudinal channels, in the outer surface of the inner member are re-entrant so as to enhance retention of the holdout means.

It will be appreciated that the shaping of the cavities has to be such as to ensure that the inner member is retained in its expanded configuration under expected conditions of storage and transport to its place of application and then to be released without the need for undue force, preferably manually, when the article is to be applied to a substrate. The shaping of the interface between the inner member and the holdout means will thus depend on factors such as (i) the material of the inner tubular member and of the holdout means, in particular the relative hardness, and (ii) the force within the expanded tubular member tending to cause it to recover, which will itself depend on the material, the expansion ratio of the member, and its thickness. Thus, for example a thickwalled inner member made of highly expanded, relatively high modulus material would require a relatively greater amount of mechanical interlocking by the holdout means due to its relatively high recovery forces.

The inner member is preferably made from polymeric, preferably elastomeric material.

One or both ends of the inner tubular member may advantageously have a bevelled (especially chamfered) internal surface. This can help to prevent the end of the tubular member digging into a substrate (e.g. a cable) around which it is recovered.

The inner member may form part of an enclosure for an electric cable splice, termination, or the like, and may be formed from electrically conductive material, for example for forming electrical continuity across, and/or electrical screening of, the joint. The inner tubular member may have one, or more, further layers on its inner surface, which may be co-extruded therewith. For example, an electrically insulating layer and/or an electrically stress grading polymeric layer may be co-extruded internally with the inner member. Such a layer may have different mechanical properties from the inner member, for example by being more resilient so as to enhance conformity with the substrate, for example a cable splice. There may also be an innermost electrically conductive layer, for example extending along only part of the length of the other layer(s), to provide a Faraday cage. An inner layer of gel, mastic or adhesive may be provided to enhance conformability and sealing, for example to exclude air and/or moisture, with the substrate. It is also envisaged that such a sealant layer may be applied separately to the substrate.

In accordance with another aspect of the present invention, there is provided a substrate, for example an electrical component, including an electric cable splice, termination, or elbow, enclosed by a recovered article in accordance with the said one aspect of the present invention.

In accordance with a further aspect of the present invention, there is provided a method of recovering a recoverable e article in accordance with the one a spect on to a substrate, by the steps of releasing the, or each, initiating portion of the holdout means from its cavity, and subsequently releasing the remaining portion of the holdout means, preferably in a sequential manner around the circumference of the article. When in the form of strips, the holdout means is preferably released by a peeling action from one end thereof to the other. Preferably there is a single initiating portion which is released, followed by the sequential release of the strips of the remaining portion of the holdout means.

Embodiments of recoverable article, their method of manufacture and application, each in accordance with the present invention, will now be described, by way of example, with reference to the accompanying drawings, in which:

FIG. 1 is an end view of an article in its expanded configuration;

FIG. 2 is an isometric view of the article of FIG. 1 showing the first step in its recovery;

FIGS. 4 and 5 show partial end views of alternative recoverable articles;

FIG. 6 shows a release member for use with the articles of FIGS. 4 and 5; and

FIG. 7 is an isometric view of a recovered article forming part of an in-line power cable splice.

Figure 3:
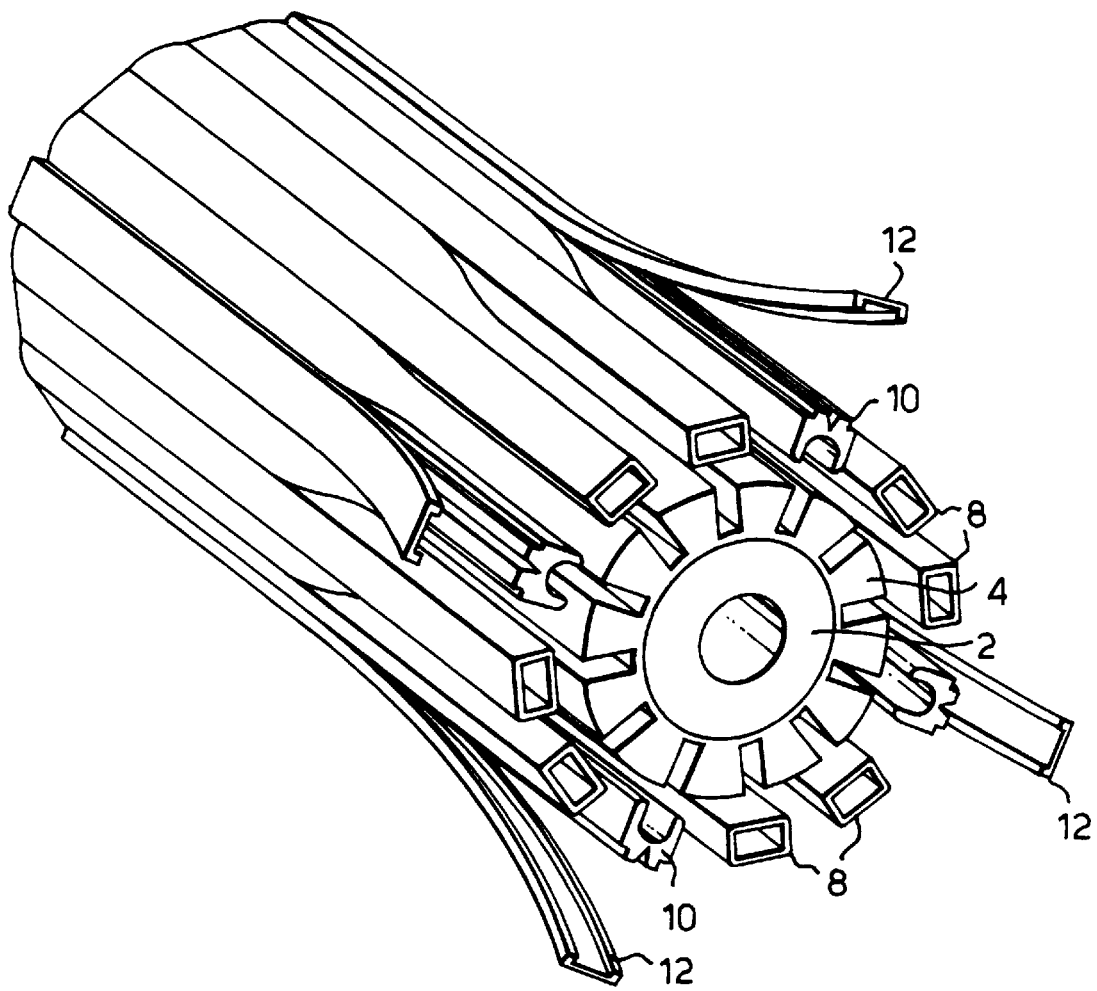
FIG. 3 is an isometric view showing part of the length of the article of FIG. 2 in its recovered form.

Referring to FIGS. 1, 2 and 3, the recoverable article comprises an innermost elastomeric electrically insulating cylindrical tubular sleeve 2, and, externally bonded thereto, an elastomeric electrically conductive member 4 that has a castellated outer surface. An external holdout arrangement consists of twelve relatively rigid polymeric strips that fill the twelve valleys of the castellated member 4 from one end thereof to the other. The holdout strips are of two kinds. The first kind of holdout strip consists of four trigger strips 6 that are equispaced circumferentially around the tubular member 4, and these are interspaced with the eight remaining strips 8 that are of a different structure.

Each strip 6 is in two parts, a generally H-shaped inner part IO that engages the valley of the expanded tubular member 4, and a snap-on cover 12. Each strip 8 consists of a hollow strip of rectangular section that fits within its valley.

The composite recoverable member 2, 4, which may have been formed by moulding or extrusion, is expanded such that the valleys on its external surface open up. The holdout strips 6, 8 are then pushed into position and the expansion means, which may be an internal mandrel, is removed. The slight relaxation of the resilient recoverable member then firmly retains the strips 6, 8 in position, and they, being relatively rigid, prevent further recovery of the article 2, 4. Removal of the strips 8 is particularly difficult, if not impossible manually, due to the high frictional forces that exist over the extensive surface area between them and the castellation valleys or channels. The trigger strips 6, however, are designed structurally differently so as to be relatively easy to remove manually, and then, by releasing some of the recovery force on the strips 8, to facilitate manual removal of the remaining strips 8.

The generally H-shape of the inner component 10 of the strips 6 allows it to act as a hinge when the outer retaining cover 12 is removed. Thus, removal of the cover 12, as by the peeling action shown in FIG. 2, results in the circumferential recovery force within the resilient member 4 exerting pressure on the radially inner legs of the H-shaped component 10 which then hinges about its cross-member so that the component 10 is urged out of its channel.

It is envisaged that the cover 12 would be removed completely, end-to-end, of each strip 6 in turn, resulting in ejection, or removal, of all four strips 6. This results in partial recovery of the composite article 2,4, and thus in an associated reduction in the stored recovery force. Consequently, the forces retaining the rigid tubular strips 8 in position are reduced, so that the strips 8 can now be removed, thereby to allow full recovery of the article 2, 4. It will be appreciated that under free recovery, that is to say in the absence of a substrate, the article will tend to return to the size at which it was originally formed. However, in practice, the article will be recovered on to a substrate of such transverse dimension, usually diameter, that there is still some unresolved recovery within the article thereby to enhance its retention on, and sealing to, the substrate.

FIG. 3 shows an alternative mode of recovery of the article, in an intermediate stage. In this mode, the four trigger strips 6 are initially released but only partway along the length of the article. The strips 8 are then released along the same length. This alternating release of the two kinds of strips is then continued along the article until it has recovered along its entire length.

FIG. 4 shows an end view of a segment of a further embodiment of the recoverable article in which a channel 80 between adjacent lands 82 of the outer surface of a resilient inner member is filled by a two-part elongate holdout strip 84. A central support part 86 of the strip 84 is of general-H shape with the narrow intermediate bridging portion forming a hinge. The other part of the holdout strip 84 consists of a pair of side strips 88 that act to provide a lower friction interface with the central part 86 than the part 86 would have with the sides of the lands 82.

Removal of the holdout 84 is achieved by means of the trigger ring 100 of FIG. 6. The ring 100 is formed from a rigid plastics material and has an annular portion 102 that is large enough to pass around the outside of the article of FIG. 4, and a set of twelve tapering fingers 104 that are axially directed and set on a circle of radius such that when the ring 100 is positioned axially at one end of the article of FIG. 4, the fingers 104 engage with respective ones of the apertures formed between the central support parts 86 and the bottom of the associated channels 80. Thus, as the ring 102 is moved along the length of the recoverable article, the central support parts 86 are triggered so as to be pulled out of the channels, allowing the article to recover. The side strips 88 may be removed separately, or may be left in place provided they do not interfere with the recovery of the article and the subsequent reduction in the transverse dimension of the channels 80.

FIG. 5 shows a modification of the article of FIG. 4, in that the central support part 90 is of general hollow rectangular shape with external corners radiussed, and side strips 92 are wedge-shaped to conform to the correspondingly-shaped side walls of the channel of the castellated inner member, and to enhance retention of the holdout part 90 therein.

The trigger ring 100 of FIG. 6 will be arranged to engage the hollow of the central part 90, and the radiussing of its inner corners will assist in its ejection.

In a further embodiment, the reduction in friction achieved by employing side pieces of a holdout, such as the side strips 88 or 92, may alternatively be achieved by spray coating the sides of the channels of the inner member or the holdout part 84, 90 with a low friction material, or by applying a grease thereto.

In the last mentioned embodiments of the invention, a retaining sheath may be needed to retain the holdout strips in position until their release is required. In such instances, the ring 100 of FIG. 6 may not be required.

FIG. 7 shows an article 140, which may be in accordance with any one of the preceding embodiments, in its recovered condition on an in-line electric power cable splice. The article 140 consists of a castellated electrically conductive resilient member 142 and an innermost layer 144 of polymeric electrically insulating material. Each cable has an outer polymeric jacket 146, folded back earth screen wires 148, and primary dielectric 150. Prior to the recovery of the article 140, the region around the connector of the cable conductors (not shown) has been enclosed within a layer 152 of stress controlling material, that has been compressed into conformity with the underlying components by the recovery of the article 140, thereby excluding air from the splice region. Although not shown, it will be understood that an outer protective jacket is to be applied to the splice as shown in FIG. 7 so as to encompass the article 140 and to seal on to each cable jacket 146. Electrical continuity across the joint, via the conductive layer 142, between the cable wires 148 will also be made. Advantageously, the outer protection jacket is as disclosed in British Patent Application No. 9626364.5, the entire contents of which are included herein by this reference.

It will be appreciated that it may be advantageous to locate the trigger portion(s) of the holdout means of the invention symmetrically around the inner tubular member, but this need not be the case. Furthermore, the number of trigger portions with respect to the number of remaining portions can be varied to suit the particular article. The recovery mode may be different from the examples given, with, for example, some of the remaining portion being removed before all the trigger portion has been removed. As a further alternative, the entire trigger portion, for example all four trigger strips 6, may be removed substantially simultaneously, followed by substantially simultaneous removal of the remaining holdout portion, for example the strip 8. In the latter embodiment, a release means functionally corresponding to that shown in FIG. 6 may be devised to remove the covers 12 of the strips 6 and then to remove the strips 8.

What is claimed is:

1. A recoverable article comprising an inner resilient tubular member that is held out in a laterally expanded configuration by engagement with outer holdout means, wherein an outer surface of the inner member is provided with a plurality of cavities, and wherein the holdout means occupies the cavities so as to provide the holdout engagement, wherein the holdout means comprises at least one initiating portion that is structurally different from a remaining portion that engages at least one associated cavity, whereby release of the initiating portion from its cavity facilitates subsequent release of the remaining portion of the holdout means.

2. An article according to claim 1, wherein the or each initiating portion comprises two parts such that (a) when the two parts engage one another, the integrity of the holdout means is maintained, and (b) when one of the two parts is released from the other part that is in engagement with the cavity, the other part is removable from the inner member.

3. An arrangement according to claim 2, wherein release of one of the two parts of the initiating member allows the other part to be ejected from the cavity by the recovery force of the inner member.

4. An article according to claim 2, wherein said one part of the initiating portion comprises an interlocking cover for the other part.

5. An article according to claim 2, wherein the two parts of the initiating portion are integral with each other.

6. An article according to claim 2, wherein the two parts are hinged together.

7. An article according to claim 2, wherein fracture of the one part allows the removal of the other part.

8. An article according to claim 2, wherein said one part is inserted within the other part thereby to prevent change of shape thereof.

9. An article according to claim 2, wherein on the release of the one part of the initiating portion, the other part undergoes a change of shape that facilitates its removal from the cavity.

10. An article according to claim 9, wherein the change of shape is effected by a pivoting movement of the other part of the initiating portion.

11. An article according to claim 1, wherein the remaining portion of the holdout means is retained by the inner member until the at least one initiating portion has been removed therefrom.

12. An article according to claim 1, wherein the cavities comprise a plurality of channels that extend longitudinally of the article, parallel to one another.

13. An article according to claim 12, further comprising one or more supports located radially inwards of the holdout strips to retain the tubular member in a substantially circular cross-sectional configuration.

14. An article according to claim 12, wherein the or each initiating portion and/or the remaining portion of the holdout means comprises a plurality of strips that are retained within respective ones of the channels.

15. An article according to claim 14, wherein at least the strips of the remaining portion of the holdout means are rigid relative to the material of the inner member.

16. An article according to claim 14, wherein there is a single initiating portion, comprising a single strip.

17. An article according to claim 14, wherein each strip comprises a plurality of longitudinally spaced-apart holdout members that substantially fill a cavity at discrete positions along its length, successive holdout members of each strip being linked together.

18. An article according to claim 1, wherein the outer surface of the inner member is castellated.

19. An article according to claim 1, wherein at least one portion of the holdout means comprises:

(a) a particulate material; or (b) a cured material; or (c) high density foam material; or (d) compacted fibrous material;

said material being retained in place by an enveloping cover, if required.

20. An article according to claim 1, wherein the holdout means comprises form-stable bio-degradable material.

21. An article according to claim 1, wherein the inner tubular member is electrically conductive.

22. An article according to claim 1, wherein the inner tubular member is made from polymeric elastomeric material.

23. An article according to claim 1, comprising an additional, radially inner, resilient tubular arrangement on which the inner tubular member is mounted integrally therewith.

24. An article according to claim 23, wherein the additional tubular arrangement comprises at least one tubular member that is more resilient than the inner resilient tubular member.

25. An article according to claim 23, wherein the additional tubular arrangement comprises an electrically insulating tubular member and/or an electrically stress-controlling tubular member.

26. An article according to claim 23, comprising an innermost electrically conductive layer radially inwards of the additional tubular arrangement, and located only in a longitudinally central region of the article so as to provide a Faraday cage.

27. An article according to claim 23 wherein the additional tubular arrangement is made from polymeric material.

28. An article according to claim 1, in which at least one end of the inner tubular member has a bevelled internal surface.

29. An article according to claim 1, of substantially right-cylindrical configuration.

* * * * *